US006892957B2

(12) United States Patent
Bennett et al.

(10) Patent No.: US 6,892,957 B2
(45) Date of Patent: May 17, 2005

(54) PRESSURE WASHER WITH IMPROVED MOBILITY

(75) Inventors: Ralph D. Bennett, Ellicott City, MD (US); Christopher J. Murray, Baltimore, MD (US); Robert H. Gifford, New Freedom, PA (US)

(73) Assignee: Black & Decker Inc., Newark, DE (US)

( * ) Notice: Subject to any disclaimer, the term of this patent is extended or adjusted under 35 U.S.C. 154(b) by 20 days.

(21) Appl. No.: 10/230,915

(22) Filed: Aug. 29, 2002

(65) Prior Publication Data

US 2004/0046044 A1 Mar. 11, 2004

(51) Int. Cl.[7] ............................ A01G 25/09; B05B 9/03

(52) U.S. Cl. ....................... 239/146; 239/124; 239/332; 239/525; 239/532; 239/722; 239/754

(58) Field of Search ................................ 239/124, 146, 239/722, 750, 754, 310, 525, 526, 532, 332, 172, 175, 126; 417/63, 234, 415, 423.1

(56) References Cited

U.S. PATENT DOCUMENTS

| | | | | |
|---|---|---|---|---|
| 3,310,828 A | | 3/1967 | Clark et al. | |
| 3,885,892 A | | 5/1975 | Dwyer et al. | |
| 3,913,837 A | * | 10/1975 | Grant | 239/754 |
| 3,940,065 A | * | 2/1976 | Ware et al. | 239/146 |
| 4,238,074 A | * | 12/1980 | Coons | 239/310 |
| 4,810,169 A | | 3/1989 | Kranzle | |
| 4,865,255 A | * | 9/1989 | Luvisotto | 239/722 |
| 5,040,950 A | | 8/1991 | Dalquist, III et al. | |
| 5,071,069 A | | 12/1991 | Stirm | |
| 5,320,281 A | | 6/1994 | Hartmann et al. | |
| 5,358,385 A | | 10/1994 | Wang | |
| 5,395,052 A | | 3/1995 | Schneider et al. | |
| 5,409,032 A | * | 4/1995 | Berfield | 239/126 |
| 5,419,497 A | * | 5/1995 | Warrington | 239/722 |
| 5,429,306 A | | 7/1995 | Schneider et al. | |
| 5,624,238 A | | 4/1997 | Herbert | |
| 5,700,137 A | | 12/1997 | Simonette | |
| 5,886,436 A | | 3/1999 | Schneider et al. | |
| 5,975,423 A | | 11/1999 | Rice et al. | |
| 6,158,677 A | | 12/2000 | Coles | |
| 6,189,811 B1 | | 2/2001 | Rudy | |
| 6,243,913 B1 | * | 6/2001 | Frank et al. | 15/321 |
| D464,471 S | | 10/2002 | Burdsall et al. | |
| 6,651,909 B1 | * | 11/2003 | Bugarin | 239/390 |

OTHER PUBLICATIONS

Karcher, "High Pressure Washer Operator Manual" Model K 260 M, Part No. 1.189–301.0.

* cited by examiner

*Primary Examiner*—Steven J. Ganey
(74) *Attorney, Agent, or Firm*—Harness, Dickey & Pierce, P.L.C.

(57) ABSTRACT

A portable pressure washer having a pump mechanism that is supported by a plurality of wheels. The pump mechanism has a rearwardly extending inlet connection and a forwardly extending outlet connection.

11 Claims, 10 Drawing Sheets

PRESSURE WASHER WITH IMPROVED MOBILITY

FIELD OF THE INVENTION

The present invention generally relates to pressure washers and more particularly to a pressure washer having a configuration with improved mobility.

BACKGROUND OF THE INVENTION

Relatively compact and portable pressure washers are an increasingly popular outdoor power tool as modern consumers become more familiar with their versatility and their capacity to reduce both water consumption and the time for performing various cleaning operations. We have observed, however, that the overall configuration of the known pressure washers is somewhat inconvenient, particularly where relatively large areas, such as the side of a house, deck, boat, vehicle or other machinery or equipment, are to be cleaned.

In this regard, the pressure washer is typically configured with a mounting stand that has a relatively low base, a handle that extends upwardly from the base, and a pair of wheels that are attached to the rear of the base. The base is employed to support the water pump and the electric or gas powered motor that operates the water pump. The base also typically includes a series of connections on a forward or side facing panel which permits the user to couple a low-pressure input (i.e., garden) hose and a high pressure output hose to the pressure washer. As the high pressure output hose is typically only about 25 to 50 feet in length, it is necessary for the user to frequently reposition the pressure washer when cleaning a relatively large area or when maneuvering around the article that is being cleaned. Repositioning of the pressure washer typically necessitates that the user halt the cleaning activity, grasp the handle of the pressure washer and push or drag the pressure washer to a new location. Needless to say, a repositioning event tends to be inconvenient and disruptive to the cleaning activity. Accordingly, there remains a need in the art for a pressure washer having improved mobility.

SUMMARY OF THE INVENTION

In one preferred form, the present invention provides a portable pressure washer having a washer mechanism and means for supporting the washer mechanism off a generally horizontal floor. The washer mechanism includes an inlet connection, an outlet connection and a center of gravity. The inlet connection is configured to be coupled to a first hose and extend from the washer mechanism in a first direction. The outlet connection is configured to be coupled to a second hose and extends from the washer mechanism in a second direction opposite the first direction. The supporting means supports the washer mechanism in a manner that permits a user to move the washer mechanism by pulling on one of the first and second hoses. The inlet and outlet connections are disposed about a generally vertical plane that extends through the center of gravity such that the washer mechanism travels in a substantially straight direction toward the user when the user pulls the second hose.

In another preferred form, the present invention provides a pressure washer having a washer mechanism, at least one front support and at least one rear support. The washer mechanism includes an inlet connection, which extends from the washer mechanism in a first direction, and an outlet connection that is configured to be coupled to an output hose and extends from the washer mechanism in a second direction opposite the first direction. The front support, which is a wheel or a skid, is coupled to the washer mechanism and configured to elevate a front portion of the washer mechanism off a generally horizontal floor. The rear support, which is also a wheel or a skid, is coupled to the washer mechanism in a position that is rearward of the at least one front support and is configured to elevate a rear portion of the washer mechanism off the generally horizontal floor. In response to a tensile force applied to the outlet connection via the output hose, the front and rear supports cooperate to facilitate movement of the washer mechanism in a direction of the tension force.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Figure 1:
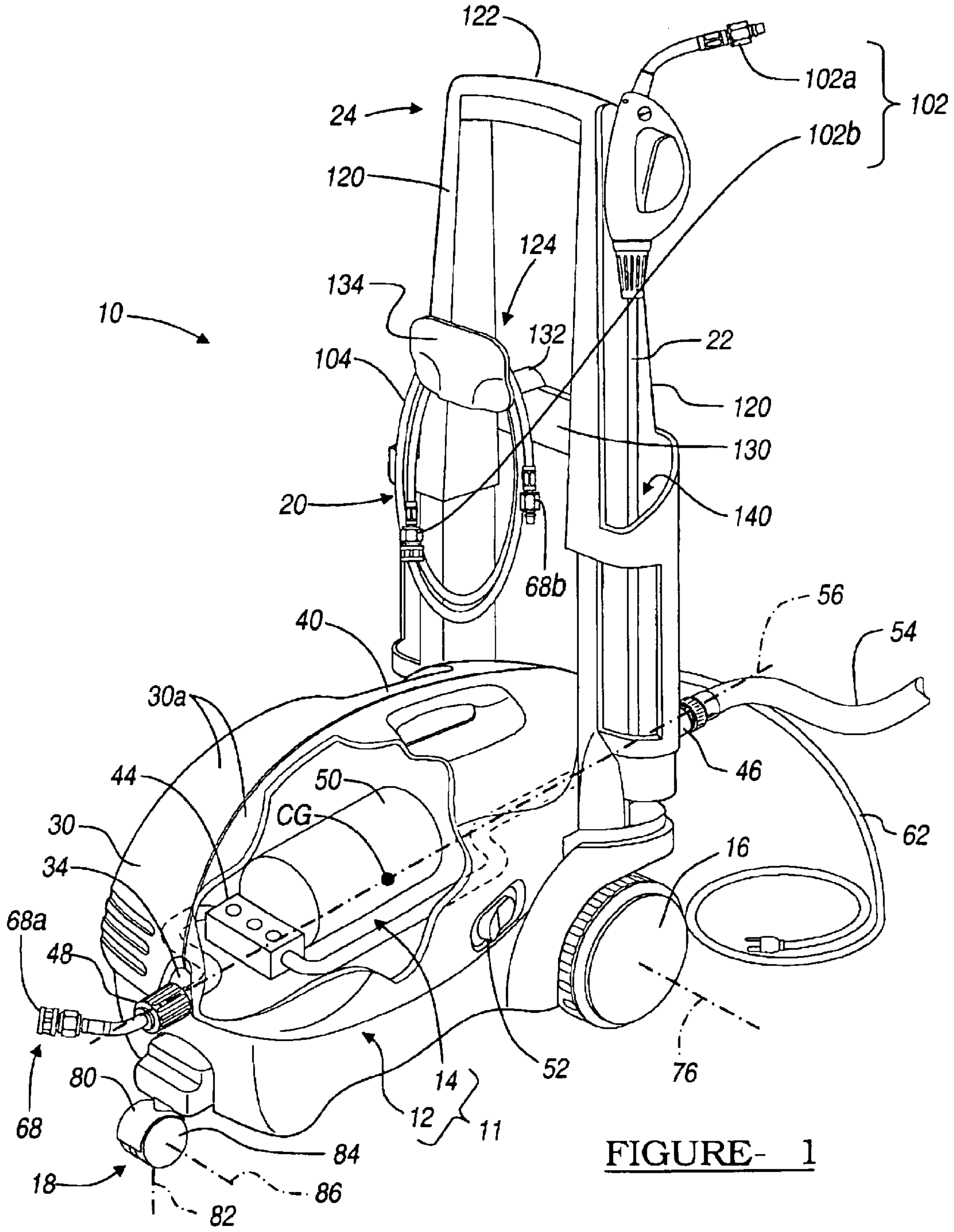
FIG. 1 is a partially broken away perspective view of a pressure washer constructed in accordance with the teachings of the present invention.

With reference to FIG. 1 of the drawings, a pressure washer constructed in accordance with the teachings of the present invention is generally indicated by reference numeral 10. In the particular example provided, the pressure washer 10 is illustrated to include a washer mechanism 11, which has a support structure 12 and a pump mechanism 14, a pair of rear wheels 16, a front caster wheel 18, a high pressure discharge hose 20, a wand 22 and a handle assembly 24.

Figure 2:
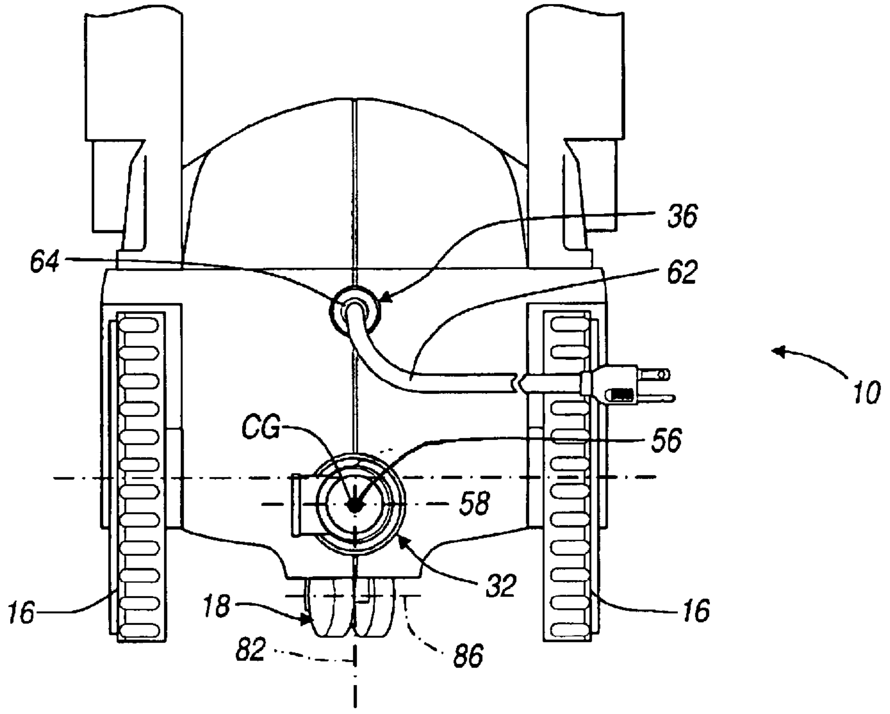
FIG. 2 is a rear elevation view of the pressure washer of FIG. 1.
Figure 3:
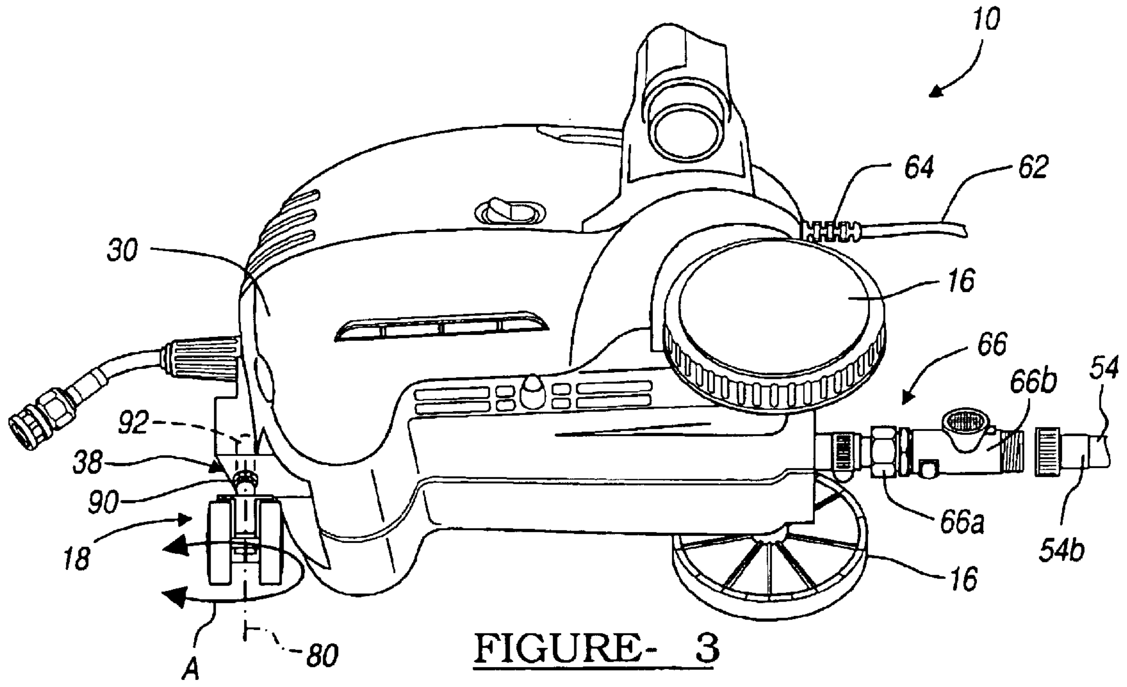
FIG. 3 is a perspective view of the left side and bottom of the pressure washer of FIG. 1.

With additional reference to FIGS. 2 and 3, the support structure 12 is operable for supporting the pump mechanism 14 and in the particular embodiment provided, is shown to include a housing 30 that substantially shrouds the pump mechanism 14. The housing 30 comprises a pair of mating housing shells 30*a* that cooperate to define a housing cavity (not shown) into which the pump mechanism 14 is mounted. The housing shells 30*a* also cooperate to form an inlet aperture 32, an outlet aperture 34, an electrical cord aperture 36, a front receiving aperture 38 and a handle 40 that permits a user to hand-carry the pressure washer 10.

The pump mechanism 14 includes a water pump 44, which includes an inlet connection 46 and an outlet connection 48, and a means for operating the water pump 44, such as an electric motor 50 and a power switch 52 for actuating the electric motor 50. Those skilled in the art will appreciate the description of the pump mechanism 14 contained herein is exemplary only and not intended to limit the scope of the disclosure in any manner. Accordingly, those skilled in the art will understand that the water pump 44 may be operated by devices other than an electric motor, such as an internal combustion engine, and that the water pump 44 need not be operated through rotary motion.

Aside from the arrangement and configuration of the inlet connection 46 and the outlet connection 48, the pump mechanism 14 is conventional and as such, a detailed discussion of its configuration and operation is not needed as pump mechanisms of this general type are well known in the art. Briefly, the inlet connection 46 is configured to be coupled to a source of water, such as a garden hose 54, to thereby couple in fluid connection the water pump 44 and the source of water. Operation of the electric motor 50 serves to reciprocate one or more pistons (not shown) in the water pump 44 so as to increase the pressure of the water in the water pump 44. The pressurized water leaves the water pump 44 via the outlet connection 48, which serves to couple the water pump 44 to the high pressure discharge hose 20.

As noted above, the arrangement and configuration of the inlet connection 46 and the outlet connection 48 are unique and novel. In this regard, the inlet connection 46 extends in a rearward direction, while the outlet connection 48 extends in a forward direction, whereas a typical commercially available pressure washer includes inlet and outlet connections that both extend in either a forwardly or a laterally extending direction. In the particular embodiment illustrated, the inlet connection 46 extends from the rear face of the housing 30 through the inlet aperture 32, and the outlet connection extends from the front face of the housing 30 through the outlet aperture 34. We prefer that the inlet connection 46 and the outlet connection 48 be arranged laterally about a common longitudinally extending axis 56, which is best illustrated in FIGS. 1 and 2, as this prevents the support structure 12 and pump mechanism 14 from crabbing to one side or the other when either of the high pressure discharge hose 20 or the garden hose 54 are pulled to move to relocate the pressure washer 10. We also prefer that the common lateral axis 56 extend through the center of gravity of the washer mechanism 11, as this aids in the reduction of crabbing. In a similar vein, the inlet connection 46 and the outlet connection 48 may also be arranged about a common vertical axis 58 to further improve the mobility of the pressure washer 10.

Also, as the pump mechanism 14 of the illustrated embodiment includes an electric motor 50, the electric cord 62 of the electric motor 50 is preferably configured and arranged to extend in a rearward direction, such as from the rear face of the housing 30 through the electrical cord aperture 36. We prefer that the electric cord 62 be positioned so as to extend in a generally vertical plane that includes the common longitudinal axis 56 (i.e., the electric cord 62 extend along an axis that is generally parallel the common longitudinal axis 56) to further prevent the support structure 12 and pump mechanism 14 from crabbing to one side or the other when either of the high pressure discharge hose 20 or the garden hose 54 are pulled to move to relocate the pressure washer 10. In the example provided, the electric cord 62 is shown to include an integral strain relief structure 64 that is configured to engage the housing shells 30*a* in a conventional and well known manner so as to inhibit both rotation and axial sliding movement of the strain relief structure 64 relative to the housing 30.

The inlet connection 46 may include any appropriate means for coupling the garden hose 54 thereto, including a conventional threaded nipple (not shown) or a conventional ¼ turn bayonette connection. Preferably, however, the inlet connection 46 includes a quick disconnect (i.e., a hydraulic poppet) coupling set 66, of the type that are well known in the art and commercially available from sources such as Snap-Tite Inc. of Erie, Pa. or Gardena Group of Germany. In the particular embodiment shown, the quick disconnect coupling set 66 includes a male portion 66*a*, which is coupled to the inlet of the water pump 44, and a female portion 66*b*, which is configured to be threadably coupled to the discharge end 54*b* of the garden hose 54. The quick disconnect coupling set 66 is preferably configured (e.g., valved) such that water does not flow through the female portion 66*b* when the male and female portions 66*a* and 66*b* are uncoupled from one another and the male and female portions 66*a* and 66*b* may be sealingly coupled to (or uncoupled from) one another in a conventional axially-engaging (axially-disengaging) manner while the water in the garden hose 54 is under pressure.

The outlet connection 48 may likewise include any appropriate means for coupling the high pressure discharge hose 20 thereto, including a conventional threaded nipple (not shown). However, the outlet connection 48 preferably includes a quick disconnect coupling set 68, of the type that are well known in the art and commercially available from sources such as Snap-Tite Inc. of Erie, Pa. or Gardena Group of Germany. As those skilled in the art will readily appreciate, the coupling set 68 may be different from the coupling set 66 due, for example, to differences in the pressure of the water flowing through coupling sets 66 and 68. The quick disconnect coupling set 68 includes a female portion 68*a*, which is coupled to the outlet of the water pump 44, and a male portion 68*b*, which is coupled to the high pressure discharge hose 20. The quick disconnect coupling set 68 is preferably configured (e.g., valved) such that water does not flow through the female portion 68*a* when the female and male portions 68*a* and 68*b* are uncoupled from one another and the female and male portions 68*a* and 68*b* may be sealingly coupled to (or uncoupled from) one another in a conventional axially-engaging (axially-disengaging) manner while the water pump 44 is operating.

The rear wheels 16 may be mounted to the support structure 12 through any conventional means so as to be rotatable in a conventional manner about an axis 76 that extends generally laterally relative to the support structure 12. For example, the rear wheels 16 may be mounted to a common axle (not shown) that is coupled to the support structure 12, or each of the rear wheels 16 may be mounted via a discrete axle (not shown), which may be unitarily formed with or without its associated rear wheel 16, and rotatably coupled to an appropriate structure, such as the support structure 12 or another structure coupled that is coupled to the support structure 12 (e.g., the handle assembly 24).

The front caster wheel 18 is a conventionally constructed caster wheel of the type that is commercially available and as such, a detailed discussion of the construction of the front caster wheel 18 need not be provided herein. Briefly, the front caster wheel 18 includes a mounting yoke 80, which is pivotably coupled to the support structure 12 about an axis 82 that is generally perpendicular to the axis 76 of the rear wheels 16, and a wheel 84, which is rotatably coupled to the mounting yoke 80 about an axis 86 that is oriented generally perpendicular to the axis 82. In the particular example provided, the mounting yoke 80 includes a pivot collar 90 and a pivot pin 92 that extends through and rotates in the pivot collar 90. The pivot collar 90 is engaged to the housing 30 so as to permit the pivot pin 92 to extend into the front receiving aperture 38. Accordingly, the front caster wheel 18 is permitted to pivot about the axis 82 in the direction of arrow A in FIG. 3. The front caster wheel 18 may optionally include one or more brake mechanisms (not shown) for selectively inhibiting the mounting yoke 80 from rotating about the axis 82 and/or the wheel 84 from rotating about the axis 86.

Figure 4:
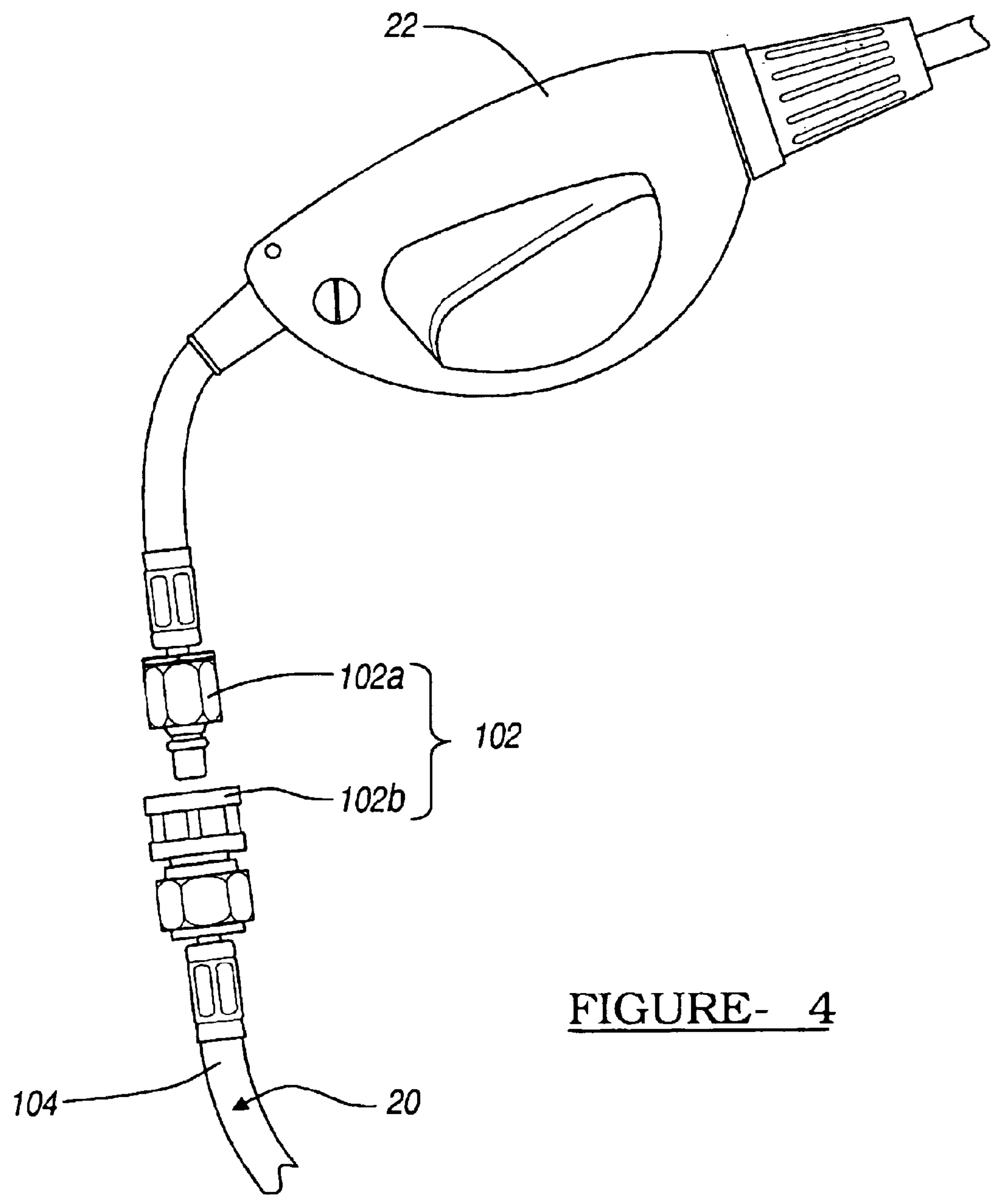
FIG. 4 is an exploded perspective view of a portion of the pressure washer of FIG. 1 illustrating the connection of the wand to the high pressure discharge hose.

With reference to FIGS. 1 and 4, the high pressure discharge hose 20 and the wand 22 of the particular example provided differ from the prior art only in the use of the female and male portions **102*a* and 102*b* of a quick disconnect coupling set 102. The quick disconnect coupling set 102 may be identical to the quick disconnect coupling set 68, or it may be configured differently (i.e., non-interchangeably configured) so as to "key" the components of the pressure washer 10 to one another. Briefly, the high pressure discharge hose 20 includes a conventional hose segment 104 with opposite ends that are coupled to the male and female portions 68*a* and 102*a*, respectively, of the quick disconnect coupling sets 68 and 102, respectively. As noted above, the end of the high pressure discharge hose 20 having the male portion 68*b* may be selectively coupled to the female portion 68*a* that is coupled to the outlet connection 48 of the pump mechanism 14. The opposite end of the high pressure discharge hose 20 to which the female portion 102*b* is coupled, may likewise be selectively coupled to the male portion 102*a* that is coupled in fluid connection to the wand 22. Configuration in this manner ensures that high pressure water will not flow through the outlet connection 48 and high pressure discharge hose 20 if they are not coupled in fluid connection to the high pressure discharge hose 20 and the wand 22**, respectively.

As illustrated in FIG. 1, the handle assembly 24 of the particular example provided is fixedly but removably coupled to the support structure 12 via a plurality of threaded fasteners (not shown). The handle assembly 24 includes a pair of laterally spaced apart side members 120 that extend generally vertically upward from the support structure 12, a handle member 122 that interconnects the distal end of the side members 120 and a hose hanger 124. The hose hanger 124 is generally Z-shaped, having a first leg member 130, which is coupled to the side members 120 at a location between the proximal and distal ends of the side members 120, a second leg member 132, which extends forwardly of the first leg member 130, and an upwardly extending abutment member 134. The second leg member 132 is configured to receive coiled materials such as the high pressure discharge hose 20, the electric cord 62 and/or the garden hose 54 when the pressure washer 10 is not being used. The abutment member 134 and the first leg member 130 abut the opposite sides of the coiled materials to inhibit the coiled materials from disengaging the second leg member 132 in an unintended manner. Storage pockets 140 may also be formed into the side members 120 for storage of the wand 22 or other items that are commonly employed during the use and/or maintenance of the pressure washer 10.

Prior to the use of the pressure washer 10, the quick connect coupling sets 66, 68 and 102 permit the user to open the water valve (not shown) to the garden hose 54, connect the garden hose 54 to the inlet connection 46, connect the high pressure discharge hose 20 to the outlet connection 48 and connect the wand to the high pressure discharge hose 20 in any order desired. The front caster wheel 18 and the rear wheels 16 permit the user to reposition the pressure washer 10 as needed without halting the pressure washing operation by simply pulling the pressure washer 10 to a desired location via the wand 22 and the high pressure discharge hose 20. If the power washer 10 is to be moved over relatively long distances, the user need only grasp the handle 40 and lift the power washer 10, or pivot the handle member 122 in a clockwise direction to pivot the power washer 10 such that its entire weight is borne by the rear wheels.

Figure 5:
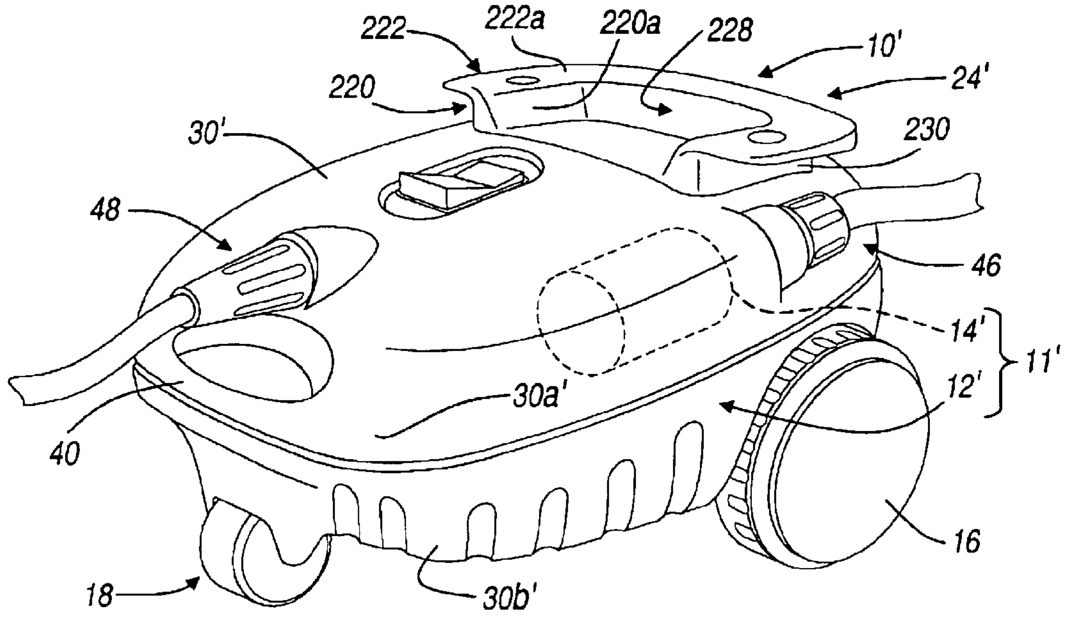
FIG. 5 is a perspective view of a second pressure washer constructed in accordance with the teachings of the present invention.
Figure 6:
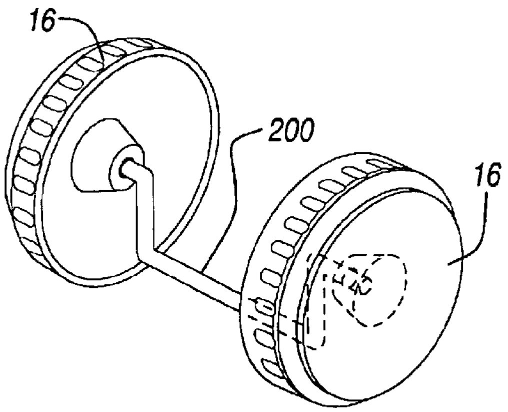
FIG. 6 is a perspective view of a portion of the pressure washer of FIG. 5 illustrating the rear axle and rear wheels in greater detail.
Figure 7:
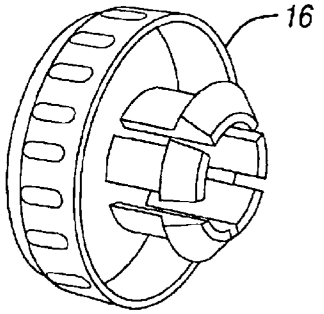
FIG. 7 is a perspective view of an alternately constructed rear wheel.
Figure 8:
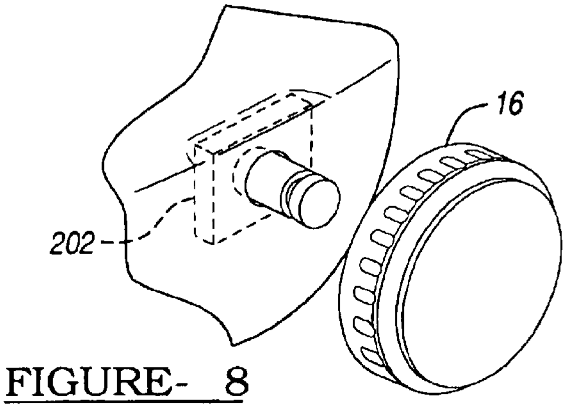
FIG. 8 is an exploded perspective view that illustrates the wheel of FIG. 7 as exploded from an axle plate.

In FIG. 5, a second pressure washer constructed in accordance with the teachings of the present invention is generally indicated by reference numeral 10'. The pressure washer 10' is generally similar to the pressure washer 10 of FIG. 1, except for the configuration of the washer mechanism 11' and the handle assembly 24'. The support structure 12' of the washer mechanism 11' is illustrated to define a housing 30' having an upper housing shell half **30*a*' and a lower housing shell half 30*b*'. With additional reference to FIGS. 6 through 8, the lower housing shell half 30*b*' may be configured in a conventional manner to receive the rear wheels 16, including apertures formed therethrough for receiving an axle 200 or an axle plate 202, whether integrally formed with the lower housing shell half 30*b*' or a discrete component that is installed to the lower housing shell half 30*b*', to which one or both of the rear wheels 16** are rotatably coupled.

Figure 9:
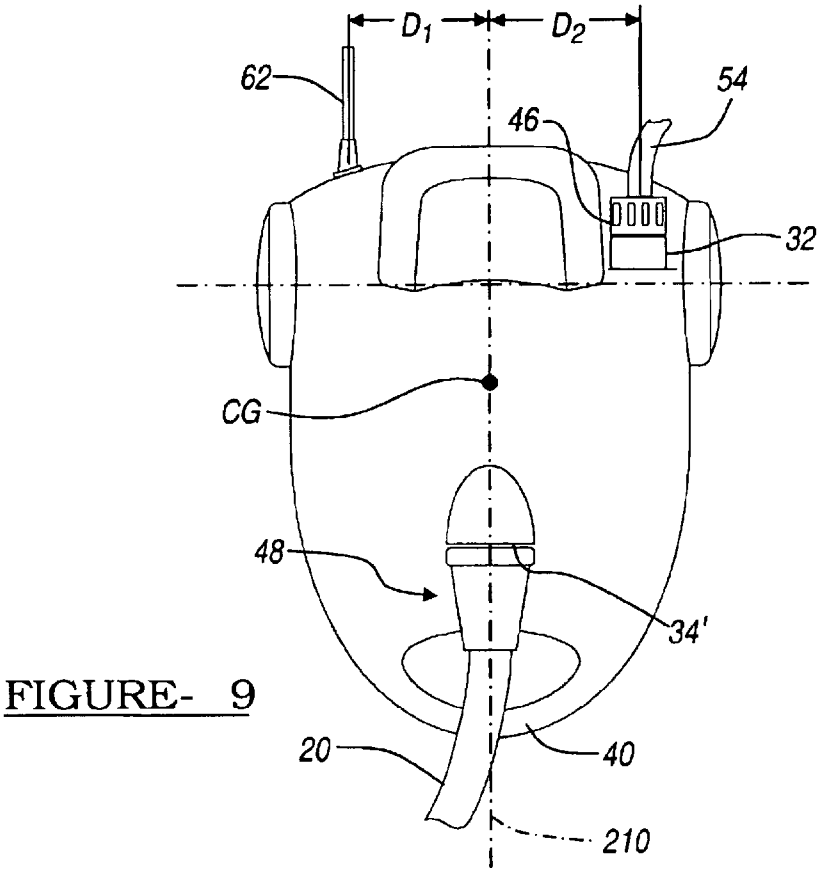
FIG. 9 is a top plan view of the pressure washer of FIG. 5.

Returning to FIG. 5 and with additional reference to FIG. 9, the upper housing shell half **30*a*' is illustrated to define an inlet aperture 32' through which the inlet connection 46 extends and an outlet aperture 34' through which the outlet connection 48 extends. The upper housing shell half 30*a*' and the pump mechanism 14' are configured such that the outlet connection 48 is positioned along an axis 210 that extends through the center of gravity of the washer mechanism 11' (the axis 210 also happens to lie in a vertical plane that includes the longitudinal axis of the washer mechanism 11'), while the input connection is located somewhat laterally offset from the axis 210. While this configuration is relatively more mobile that the prior art pressure washers of which we are aware, some crabbing can be expected with this configuration for the reasons noted above. To combat crabbing, the electric cord 62 (for those pump mechanisms that include an electric motor) may extend from the opposite lateral side of the axis 210. Those skilled in the art will appreciate that the inlet connection 46 and the electric cord 62 need not be spaced symmetrically about the axis 210. For example, it may be advantageous to space the electric cord 62 relatively further from the axis 210 to increase its crabbing effect to thereby more fully negate the crabbing effect of the garden hose 54**.

The handle assembly 24' may be a discrete structure that is fixedly coupled via screws (not shown), for example, to the support structure 12' or it may be integrally formed therewith (e.g., as a part of the upper housing shell half 30*a*'). In the particular example provided, the handle assembly 24' is a discrete structure that includes a wall member 220 and a laterally extending member 222 that is coupled to the distal side of the wall member 220. The handle assembly 24' is generally U-shaped, such that the lateral sides 222*a* of the laterally extending member 222 overlie the lateral sides 220*a* of the wall member 220. The wall member 220 and laterally extending member 222 are preferably contoured so as to define a gripping portion 228 that is configured to be engaged by the palmar surface and fingers of a user's hand when the user is gripping the handle assembly 24'. The lateral sides 220*a* and 222*a* of the wall member 220 and the laterally extending member 222 form a hose/cord wrap 230 about which the electrical cord 62 and/or the high pressure discharge hose 20 may be wrapped.

Figure 10:
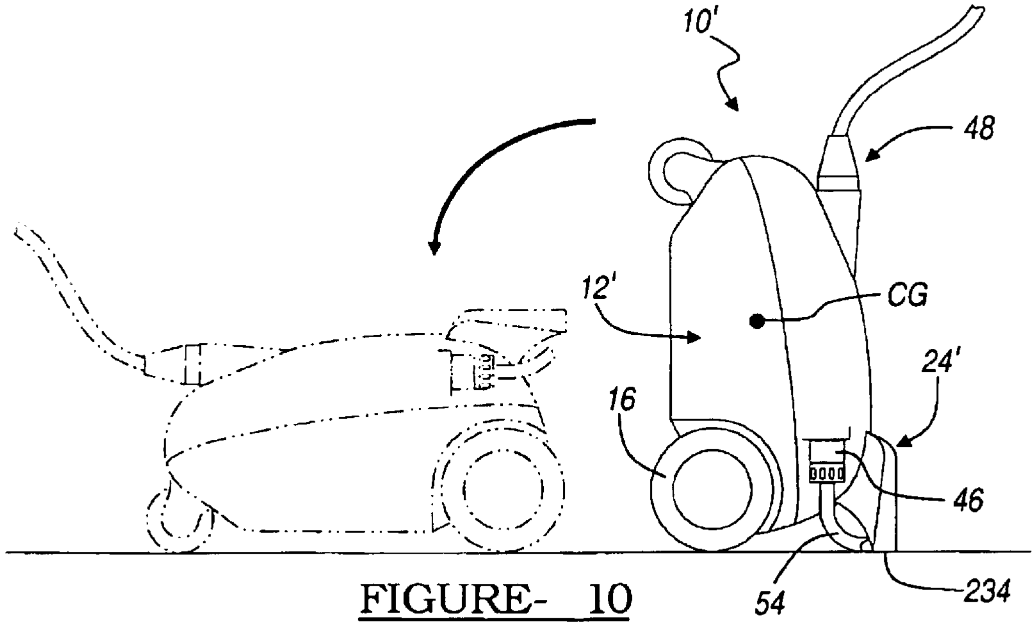
FIG. 10 is a side elevation view of the pressure washer of FIG. 5 with the pressure washer being rotated into a generally vertical position.

Additionally, the handle assembly 24 is configured such that it includes a bumper 234 that is able to cooperate with the rear wheels 16 to maintain the support structure 12' in a generally vertical orientation as illustrated in FIG. 10. As it is presently contemplated that the pressure washer 10' may be placed (as desired) in the vertical orientation during operation as well as storage, the inlet connection 46 is positioned somewhat forwardly relative to the support structure 12' as compared to the embodiment of FIG. 1. This longitudinal offset permits the garden hose 54 to bend in response to contact with the ground in a manner that does not cause the garden hose 54 to exert a force onto the support structure 12' that would tend to push it into the horizontal orientation of FIG. 5.

Figure 11:
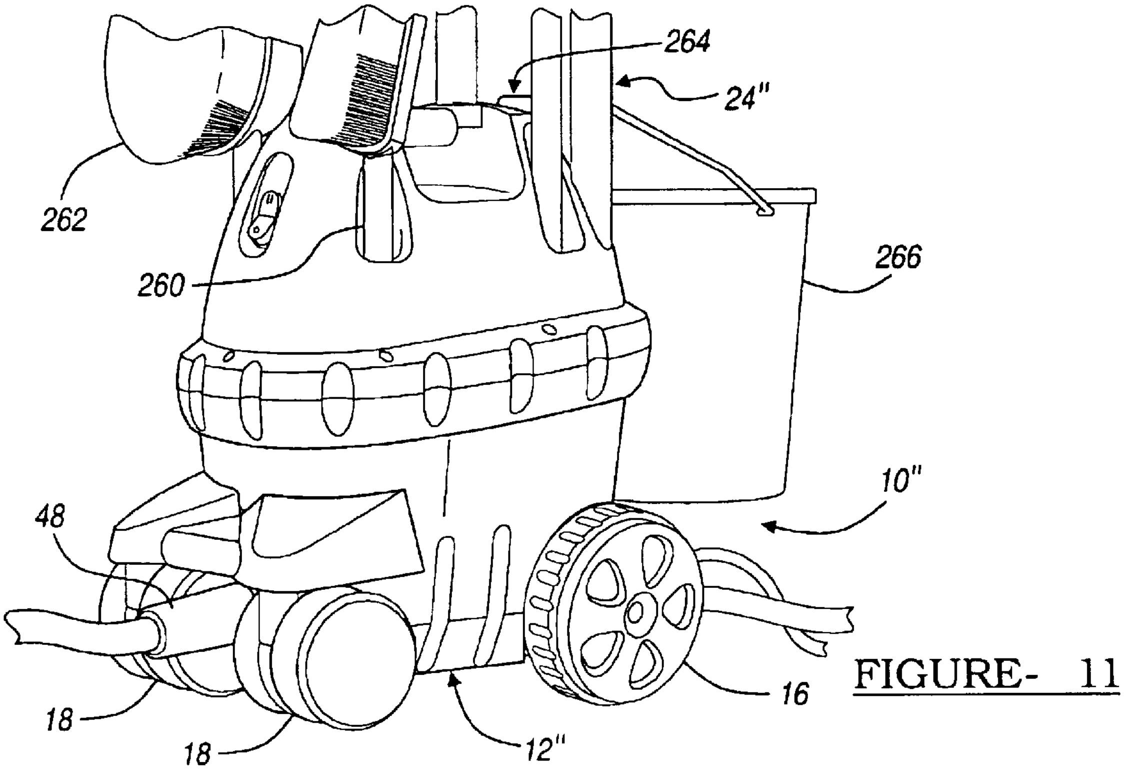
FIG. 11 is a perspective view of a third pressure washer constructed in accordance with the teachings of the present invention.
Figure 12:
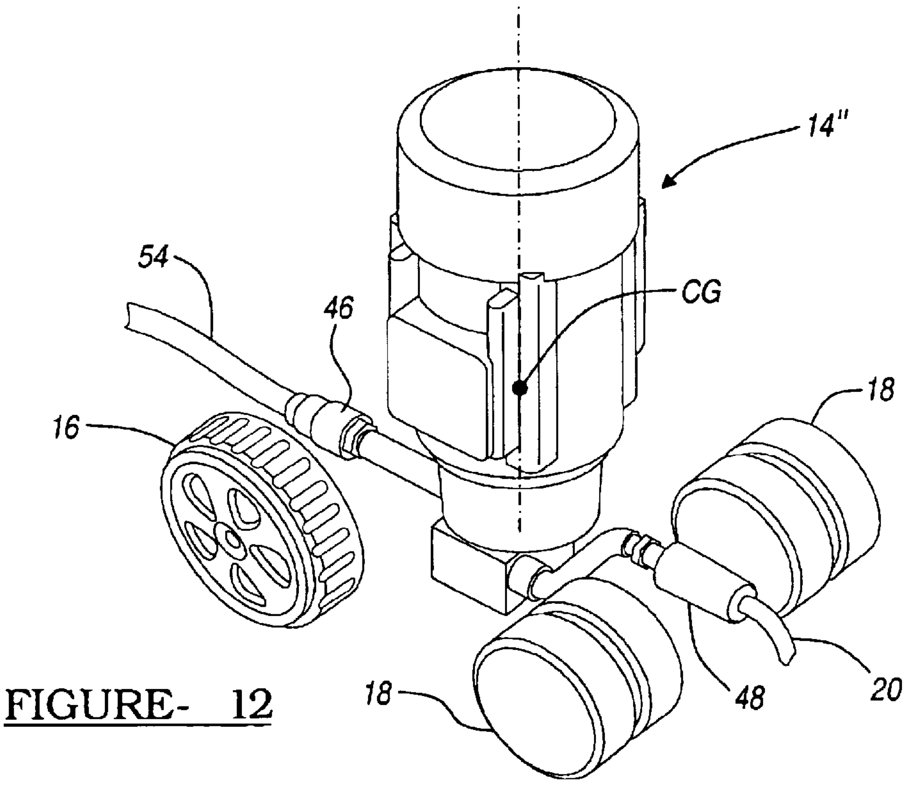
FIG. 12 is a perspective view of a portion of the pressure washer of FIG. 11 illustrating the arrangement of the pump mechanism relative to the front and rear wheels.
Figure 13:
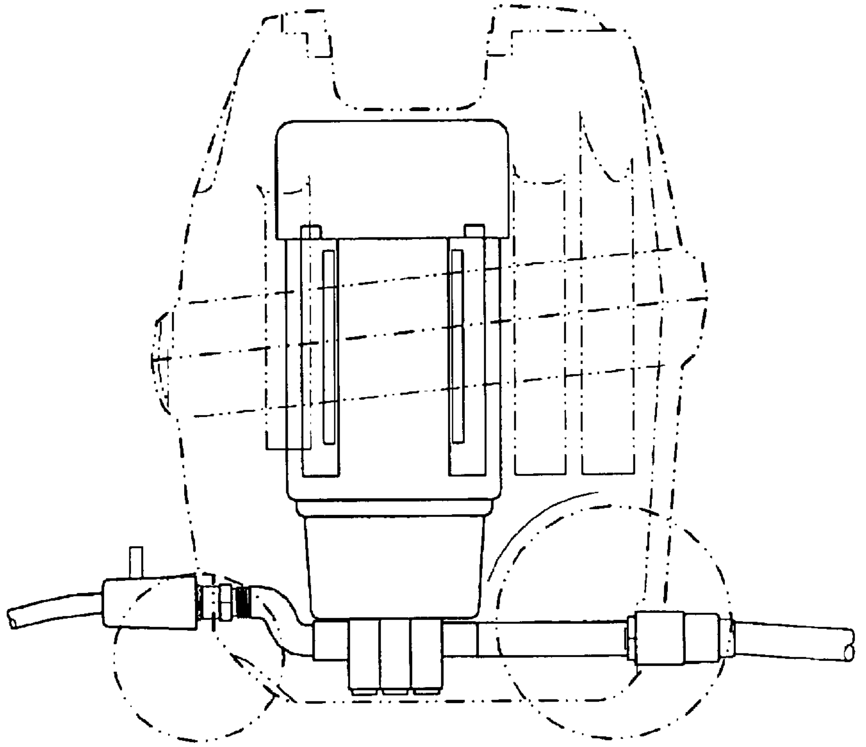
FIG. 13 is a partially broken away side elevation view of the pressure washer of FIG. 11.

In FIGS. 11 through 13, a third pressure washer constructed in accordance with the teachings of the present invention is generally indicated by reference numeral 10". The pressure washer 10" is generally similar to the pressure washer 10 of FIG. 1, except that the pump mechanism 14" is illustrated to be arranged in a generally vertical manner, dual front caster wheels 18 are employed, and the support structure 12" and handle assembly 24" are constructed to provide additional storage (e.g., front pockets 260 for holding brush accessories 262 and a bucket hanger 264 on which a bucket 266 may be hung).

In this embodiment, the pressure washer 10" is relatively tall and as such, the inlet connection 46 and outlet connection 48 are positioned below the pressure washer's center of gravity so as to reduce the chance that the pressure washer 10" will tip when the high pressure discharge hose 20 or the garden hose 54 are pulled to reposition the pressure washer 10". Preferably, the dual front caster wheels 18 are spaced apart by a sufficient dimension so that the outlet connection 48 and the high pressure discharge hose 20 do not inhibit the front caster wheels 18 from rotating through an angle of 360°.

Figure 14:
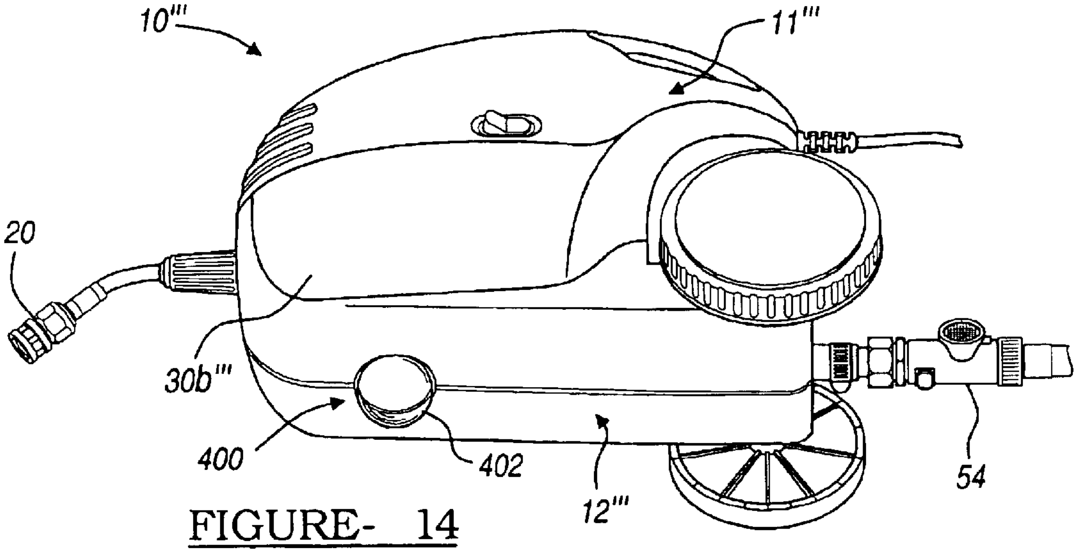
FIG. 14 is a perspective view similar to that of FIG. 3 but illustrating a fourth embodiment of the present invention.

In FIG. 14, a fourth pressure washer constructed in accordance with the teachings of the present invention is generally indicated by reference numeral 10'". Pressure washer 10'" is generally similar to pressure washer 10' (FIG. 5) in its construction and operation, but includes a front skid 400 rather than a front caster wheel. In the particular embodiment illustrated, the front skid 400 is integrally formed with the support structure 12'" although those skilled in the art will appreciate that the front skid 400 may also be a discrete structure that is coupled to the support structure 12'".

Figure 15:
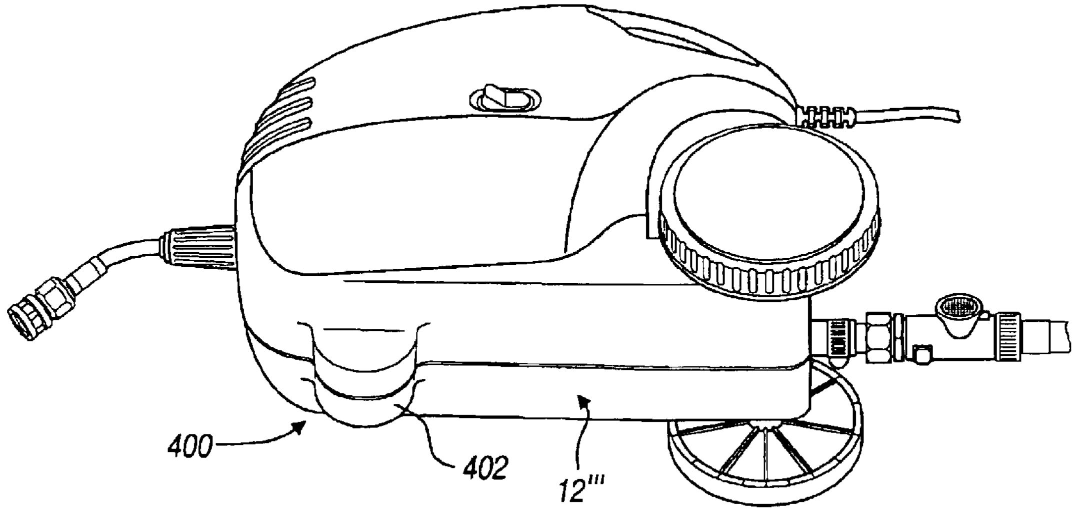
FIGS. 15 through 20 are views that are similar to FIG. 14 but which illustrate an alternate configuration of the structures that support the washer mechanism off the ground.
Figure 16:
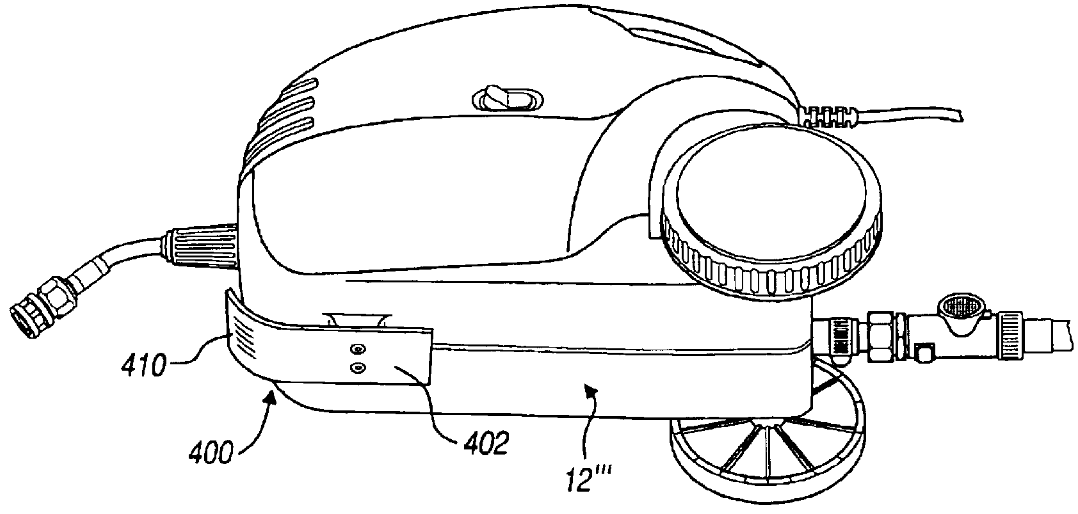

More specifically, the support structure 12'" includes a lower housing shell half 30*b*'" having a foot 402 that is positioned along an axis that lies in a vertical plane that intersects the center of gravity of the washer mechanism 11'". The foot 402 is provided to support the front of the washer mechanism 11'" with relatively low frictional resistance so that the user may reposition the washer mechanism 11'" by simply pulling the high pressure discharge hose 20 or the garden hose 54. Accordingly, the foot 402 may be configured in numerous ways, including for example, at least partially defined by a spherical radius as is shown in FIG. 14, or defined a radius in planes that are parallel to the axis with a chamfer or radius being used to make the transition from the bottom of the foot 402 to the sides of the foot 402 as is shown in FIG. 15, or generally flat with an upwardly rounded leading edge 410 as is shown in FIG. 16.

Figure 17:
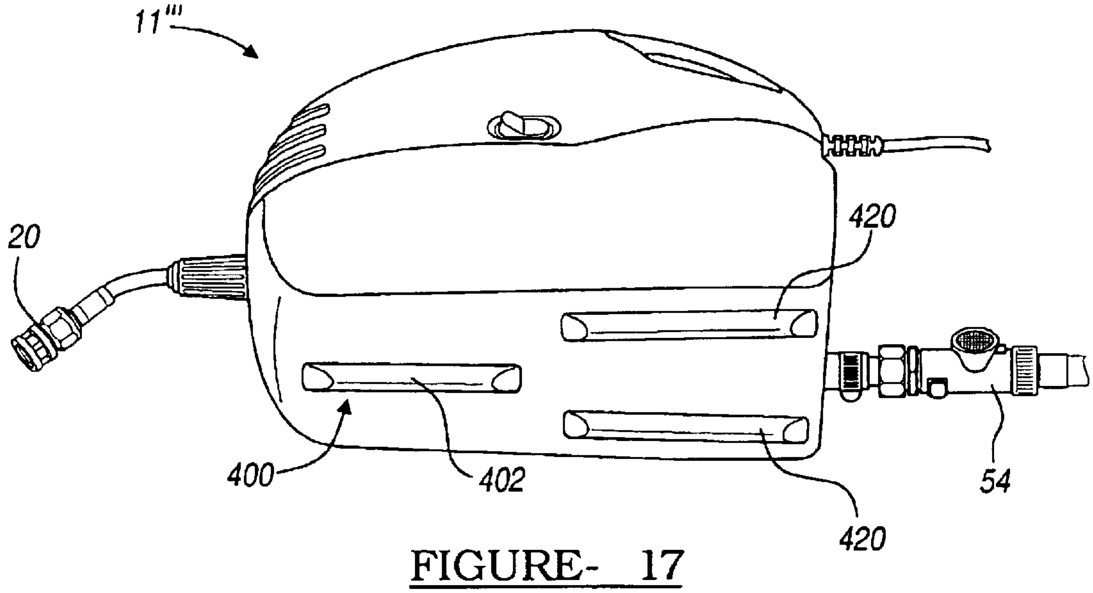

The embodiment of FIG. 17 is generally similar to that of FIG. 14, except that the rear wheels have also been replaced with one or more rear skids or feet 420. The rear feet 420 (or foot) is provided to support the rear of the washer mechanism 11'" with relatively low frictional resistance so that the user may reposition the washer mechanism 11'" by simply pulling the high pressure discharge hose 20 or the garden hose 54.

Figure 18:
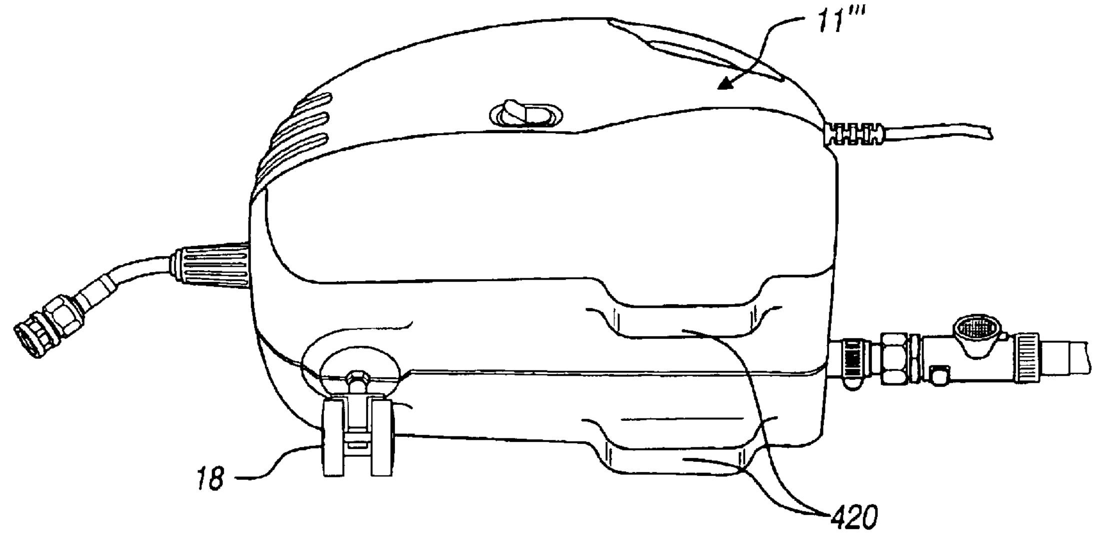
Figure 19:
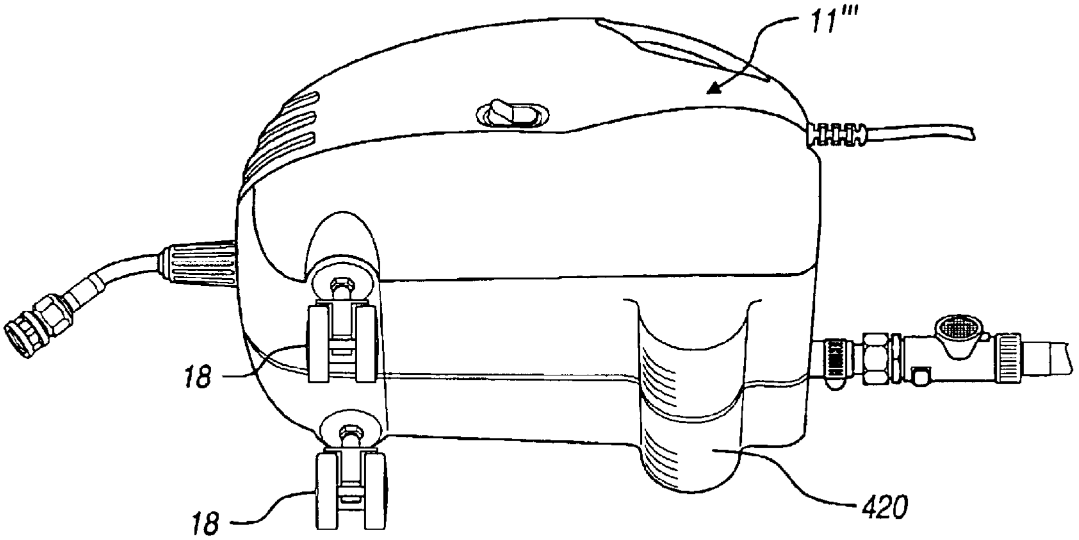
Figure 20:
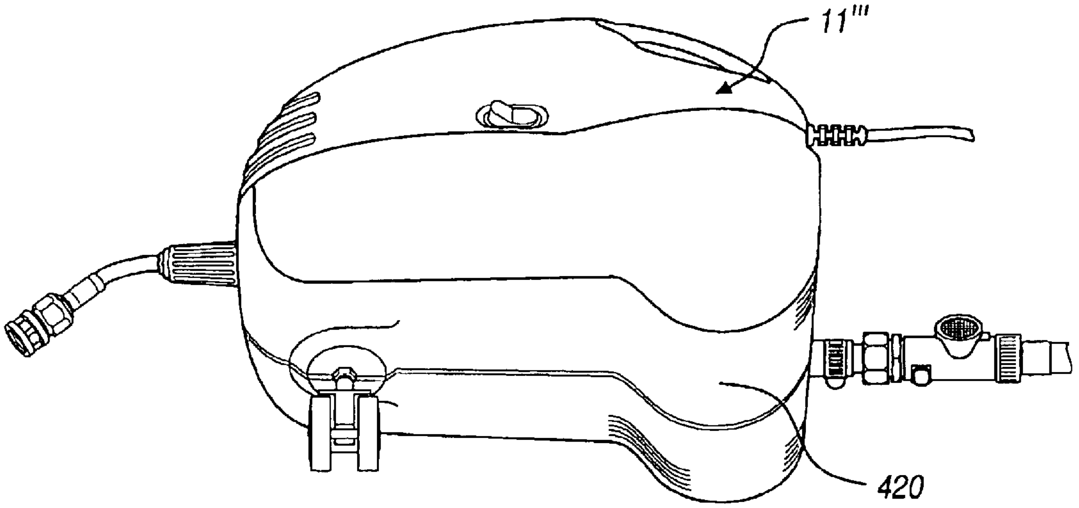

The embodiments of FIGS. 18 through 20 are generally similar in concept to the embodiment of FIG. 14, except that the rear wheels have been replaced by one or more feet 420, while one or more front caster wheels 18 are employed to support a front portion of the washer mechanism 11'".

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A portable pressure washer comprising:

a washer mechanism having an inlet connection, an outlet connection and a center of gravity, the inlet connection being configured to be coupled to a first hose and extending from the washer mechanism in a first direction, the outlet connection being configured to be coupled to a second hose and extending from the washer mechanism in a second direction opposite the first direction; and means for supporting the washer mechanism off a generally horizontal floor in a manner that permits a user to move the washer mechanism by pulling on one of the first and second hoses;

wherein the inlet and outlet connections are disposed about a generally vertical plane that extends through the center of gravity such that the washer mechanism travels in a substantially straight direction toward the user when the user pulls the second hose;

wherein the outlet connection is aligned about an axis that lies in the generally vertical plane; and wherein the inlet connection is aligned about the axis of the outlet connection.

2. The portable pressure washer of claim 1, where in the inlet and outlet connections are further aligned about a second axis that is generally parallel the floor.

3. The portable pressure washer of claim 1, wherein the washer mechanism includes a water pump, an electric motor for operating the water pump and an electric cord for coupling the electric motor to a source of electricity, the electric cord extending from the washer mechanism about an axis that lies in the generally vertical plane.

4. The portable pressure washer of claim 1, wherein the inlet and outlet connections are further aligned about a second axis that is generally parallel the floor.

5. The portable pressure washer of claim 1, wherein the supporting means includes a pair of rear wheels.

6. The portable pressure washer of claim 5, wherein the supporting means includes at least one device for supporting a front portion of the washer mechanism, the at least one device being selected from a group consisting of feet and wheels.

7. The portable pressure washer of claim 6, wherein the supporting means includes a front caster wheel.

8. A portable pressure washer comprising:

a washer mechanism having an inlet connection and an outlet connection, the inlet connection extending from the washer mechanism in a first direction, the outlet connection being configured to be coupled to an output hose and extending from the washer mechanism in a second direction opposite the first direction; and at least one front support that is coupled to the washer mechanism and configured to elevate a front portion of the washer mechanism off a generally horizontal floor;

at least one rear support that is coupled to the washer mechanism in a position that is rearward of the at least one front support, the at least one rear support being configured to elevate a rear portion of the washer mechanism off the generally horizontal floor;

wherein the front and rear supports are selected from a group of supports consisting of skids and wheels;

wherein in response to a tensile force applied to the outlet connection via the output hose, the front and rear supports cooperate to facilitate movement of the washer mechanism in a direction of the tension force; and wherein the inlet and outlet connections are aligned about a common axis that lies in a generally vertical plane.

9. The portable pressure washer of claim 8, wherein the inlet and outlet connections are further aligned about a second axis that is generally parallel the floor.

10. The portable pressure washer of claim 8, wherein the washer mechanism includes a water pump, an electric motor for operating the water pump and an electric cord for coupling the electric motor to a source of electricity, the electric cord extending from the washer mechanism about an axis that lies in the generally vertical plane.

11. A portable power washer comprising:

a washer mechanism having a pump mechanism and a support structure, the pump mechanism having a water pump, which includes an inlet connection and an outlet connection, and an electric motor for operating the water pump, the electric motor including an electric cord for coupling the electric motor to a source of electricity, the support structure defining a housing that at least partially shrouds the pump mechanism such that the inlet connection extends in a generally rearward direction and the outlet connection extends in a generally forward direction opposite the inlet connection, the inlet and outlet connections being disposed about a common axis that extends through a center of gravity of the washer mechanism, the electric cord extending from the washer mechanism in the generally rearward direction and lying in a generally vertical plane that includes the common axis;

a pair of first wheels coupled to the washer mechanism and rollable about a first axis that is generally perpendicular to the common axis; and at least one second wheel coupled to the washer mechanism and rollable about a second axis that is parallel the first axis and spaced apart therefrom;

wherein at least one of the first wheels and the second wheel is a caster wheel.

* * * * *